(12) United States Patent
Huang et al.

(10) Patent No.: US 8,049,815 B2
(45) Date of Patent: Nov. 1, 2011

(54) CAMERA MODULE HAVING VOICE-COIL MOTOR

(75) Inventors: Fu-Min Huang, Taipei Hsien (TW); Wen-Ching Lai, Taipei Hsien (TW); Sheng-Hung Hou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 478 days.

(21) Appl. No.: 12/331,436

(22) Filed: Dec. 10, 2008

(65) Prior Publication Data

US 2010/0033616 A1 Feb. 11, 2010

(30) Foreign Application Priority Data

Aug. 8, 2008 (CN) .......................... 2008 1 0303600

(51) Int. Cl.
*H04N 5/225* (2006.01)

(52) U.S. Cl. ....................................... 348/374

(58) Field of Classification Search ................... 348/374
See application file for complete search history.

(56) References Cited

U.S. PATENT DOCUMENTS

| 7,221,524 | B2 * | 5/2007 | Ye et al. .......................... 359/819 |
| 7,663,823 | B2 * | 2/2010 | Chung ........................... 359/824 |
| 2008/0037143 | A1 * | 2/2008 | Yoon ............................ 359/824 |
| 2008/0192124 | A1 * | 8/2008 | Nagasaki .................. 348/208.11 |
| 2008/0198254 | A1 * | 8/2008 | Nagasaki ....................... 348/335 |
| 2009/0252488 | A1 * | 10/2009 | Eromaki et al. ............... 396/529 |

FOREIGN PATENT DOCUMENTS

| CN | 1538234 A | 10/2004 |
| CN | 1952719 A | 4/2007 |
| JP | 2008-58964 A | 3/2008 |
| KR | 10-0803245 B1 | 2/2008 |

* cited by examiner

*Primary Examiner* — James Hannett
(74) *Attorney, Agent, or Firm* — Altis Law Group, Inc.

(57) ABSTRACT

A camera module includes an image sensor, a substrate, a lens part, a lens holder, and a voice-coil motor (VCM). The image sensor is supported on and electrically connected to the substrate. The lens holder has a bottom end and an upper end opposite to the bottom end. The image sensor is accommodated within the lens holder. The lens part includes a lens barrel which has an upper portion and a bottom portion and is disposed on the lens holder. The VCM includes a winding coiling around the upper portion and a set of permanent magnetic members fixedly fixed and surrounding the winding. The outer diameter of the upper portion is smaller than that of the bottom portion. The VCM is configured for driving the lens part to move toward to or away from the image sensor.

16 Claims, 6 Drawing Sheets

CAMERA MODULE HAVING VOICE-COIL MOTOR

BACKGROUND

1. Technical Field

The present disclosure relates to camera modules and, particularly, to a camera module using a voice-coil motor.

2. Description of the Related Art

Some camera modules include a lens part, a voice-coil motor (VCM), and an image sensor. The lens part normally includes a lens barrel and a number of lenses received in the lens barrel. The VCM includes a winding coiling around the outer surface of the lens barrel and a set of permanent magnetic members fixing and surrounding the winding. When applying different directions of current to the winding, the winding, magnetically forced by the magnetic members, can focus the lens part by moving it toward or away from the image sensor to focus. However, the VCM surrounding the lens part increases overall size of the camera module, which is not beneficial for miniaturization of the camera module.

Therefore, what is desired is a camera module that can overcome the above described problems.

BRIEF DESCRIPTION OF THE DRAWINGS

Many aspects of the present camera module should be better understood with reference to the accompanying drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION

Embodiments of the present camera module will be now described in detail with reference to the drawings.

Figure 1:
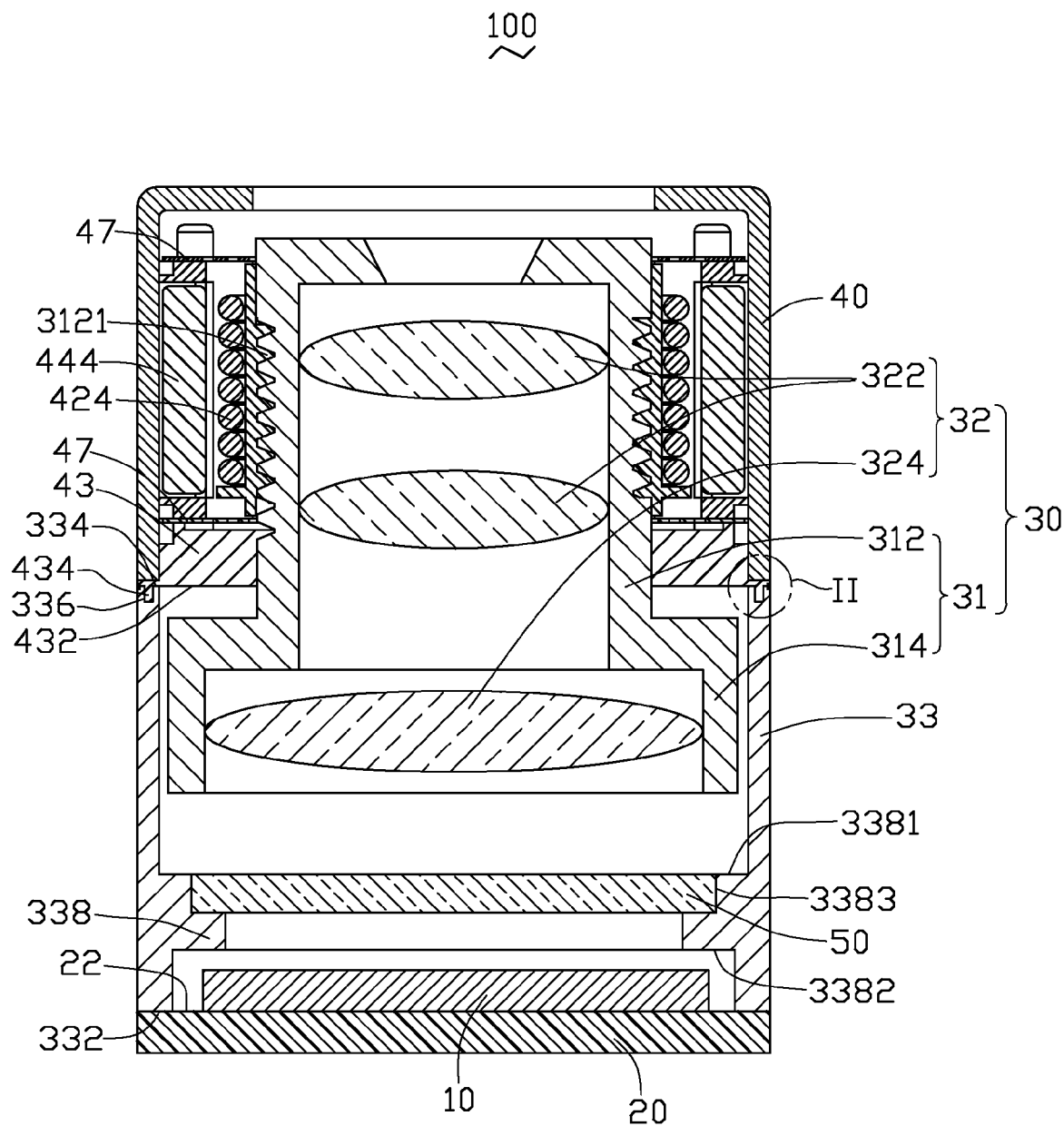
FIG. 1 is a schematic, cross-sectional view of a camera module which includes a voice-coil motor (VCM), according to a first exemplary embodiment.

Referring to FIG. 1, a camera module 100 mounted on a body, according to a first exemplary embodiment, includes an image sensor 10, a substrate 20, a lens part 30, a lens holder 33, a voice-coil motor (VCM) 40, and a transparent cover 50. The image sensor 10 is supported on and electrically connected to the substrate 20. The lens holder 33 has a bottom end 332 supported on the substrate 20 and an upper end 334 opposite to the bottom end 332. The image sensor 10 is accommodated within the lens holder 33. The lens part 30 includes an upper portion 312 and a bottom portion 314, and is disposed on the lens holder 33. The VCM 40 includes a winding 424 coiled around the upper portion 312 and a set of permanent magnet members 444 fixed in places surrounding the winding 424. The outer diameter of the upper portion 312 is smaller than that of the bottom portion 314 so that the VCM 40 is sleeved around the upper portion 312 without increasing the outer diameter of the lens part 30. The VCM 40 is configured to drive the lens part 30 to move toward or away from the image sensor 10.

The image sensor 10 can be a charged-coupled device (CCD), or a complementary metal-oxide-semiconductor transistor (CMOS). The image sensor 10 is configured to convert light signals into electrical signals. The image sensor 10 is one selected from the group consisting of a ceramic leaded chip carrier package type image sensor, a plastic leaded chip carrier package type image sensor and a chip scale package type image sensor.

The substrate 20 is made of an insulative material such as: polyimide, ceramic, or glass fiber. The substrate 20 defines a supporting surface 22 for supporting the image sensor 20. The image sensor 10 may be mechanically and electrically connected to the substrate 20 by a package process, for example, chip-scale, wafer-level chip-scale, ceramic leaded, plastic leadless chip, thermal compression bonding, or a flip chip packaging process.

In addition to the upper portion 312 and bottom portion 314, the lens part 30 further includes a lens assembly 32: two first lenses 322 of small diameter and a second lens 324 of large diameter. The first lenses 322 are received in the upper portion 312. The second lens 324 is received in the bottom portion 314. It should note that, the lens part 30 also can include a lens barrel 31. The lens top portion 312 and the lens bottom portion 314 are set on the lens barrel 31. In other word, the lens barrel 31 is adder-like, and includes a top portion and a bottom portion, the lens top portion 312 corresponds with the top portion of the lens barrel 31, and the bottom portion 314 corresponds with the bottom portion of the lens barrel 31.

The lens holder 33 is a tube having a square outer circumference and a circular inner circumference. The internal diameter of the circular inner circumference of the lens holder 33 is larger than that of the bottom portion 314. Accordingly, the bottom portion 314 can be received in the lens holder 33.

The transparent cover 50, such as an infrared cut filter, is provided between the image sensor 10 and the lens part 30, and is configured for protecting the image sensor 10 from being optically stained and/or filtering light from the lens part 30. In detail, the lens holder 33 further includes a projection 338 extending inwards, substantially parallel to the image sensor 10. The projection 338 has a first surface 3381 facing away from the image sensor 10, and a second surface 3382 facing the image sensor 10. The first surface 3381 defines a cover-receiving portion 3383 for receiving the transparent cover 50.

Figure 3:
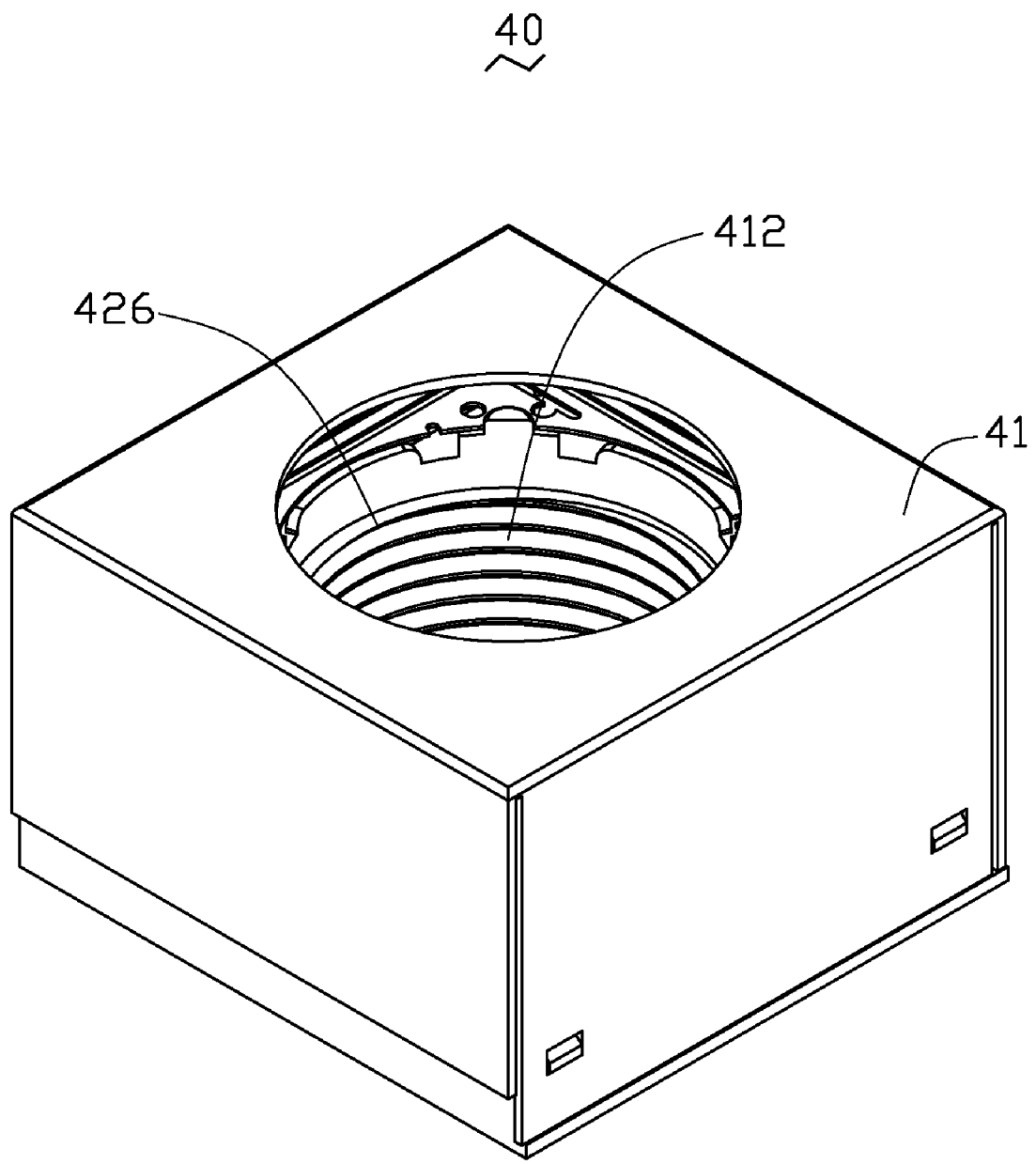
FIG. 3 is a schematic, isometric and assembled view of the VCM of FIG. 1.
Figure 4:
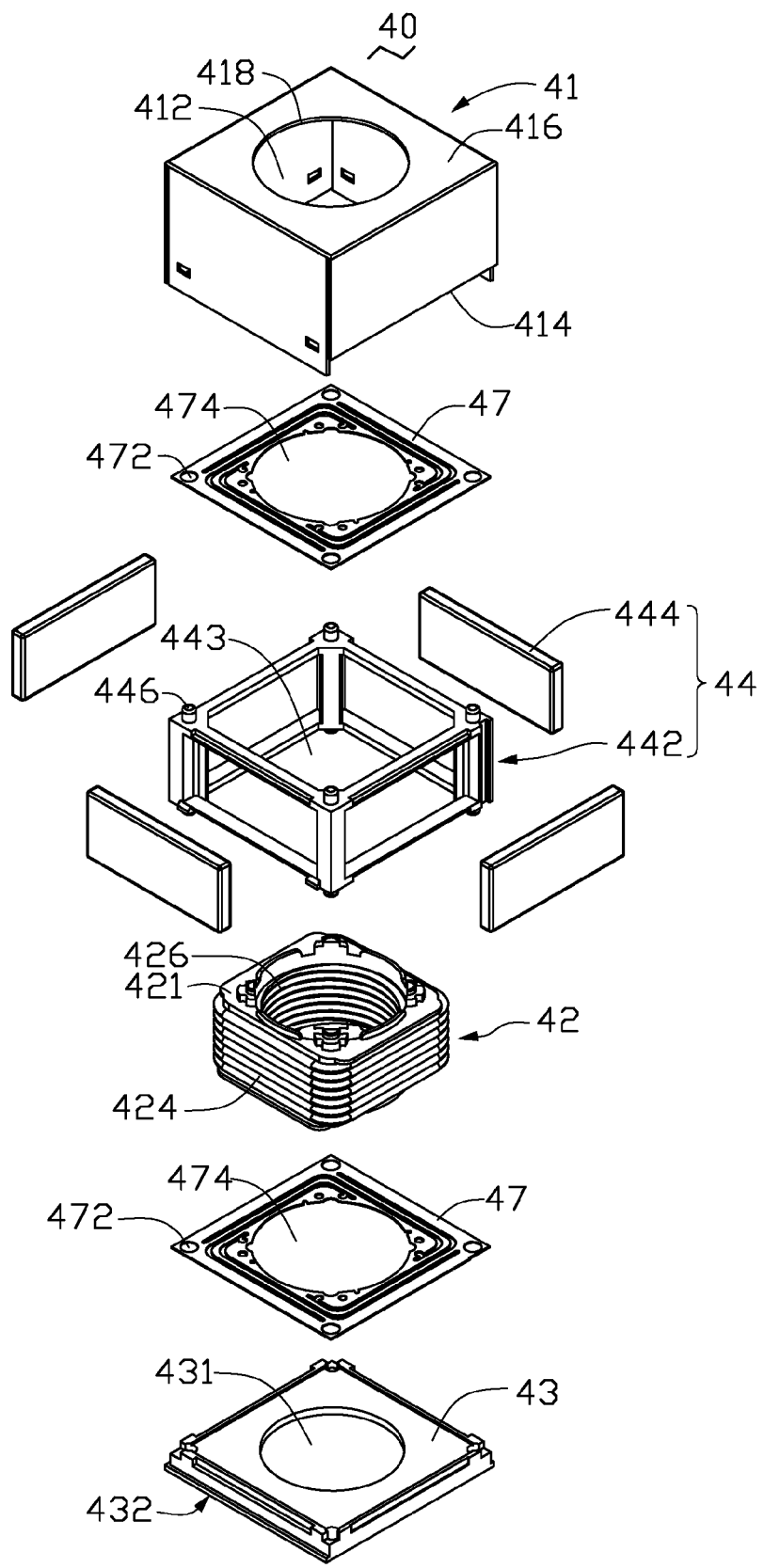
FIG. 4 is a schematic, isometric and exploded view of the VCM of FIG. 3.

Referring to FIGS. 3-4, in this embodiment, the VCM 40 includes a housing 41, a fixed unit 44, a movable unit 42, two resilient sheets 47, and a supporting board 43. The housing 41 together with the supporting board 43 defines a space 412 for receiving the fixed unit 44 and the movable unit 42.

The housing 41 is a hollow cube having an open side 414 and an semi-open side 416 opposite to the opened side 414. The semi-opened side 416 defines a through hole 418 to allow light to transmit through the housing 41. The housing 41 can be made from electromagnetic shield material, such as nick alloy, conductive plastic, surface conductive material, conductive glass, etc.

The fixed unit 44 includes a cuboid bracket 442 and four magnet members 444. The four magnet members 444 can be framed in the cubic bracket 442 as four sidewalls of the bracket 442 and thereby define a receiving space 443 therein for receiving the movable unit 42. Four first locating pins 446 respectively protrude perpendicularly away from four corners of the upper and bottom sides of the bracket 442 at each corner thereof. The two resilient sheets 47 are substantially rectangular in shape, and each defines four locating holes 472 each aligned with a corresponding one of the first locating pins 446, and a central hole 474 aligned with the through hole 418 of the semi-open side 416 of the housing 41. The two resilient sheets 47 are attached to the upper and bottom side of the cuboid bracket 442 by inserting the first locating pins 446 into the corresponding locating holes 472 of the resilient 47, and thereby limit movement of the movable unit 42 therebetween. Also, adhesive can be used to enhance strength of engagement between the resilient sheets 47 and the cuboid bracket 442.

The movable unit 42 includes an inner barrel 421 and a winding 424. The winding 424 is coiled around the outer surface of the inner barrel 421. In detail, the outer surface of the upper portion 312 of the lens barrel 31 defines an outer threaded section 3121. An inner threaded section 426 is defined inside the inner barrel 421. The upper portion 312 is coupled to the inner barrel 421 by thread engagement between the outer and inner threaded sections 3121, 426.

Figure 2:
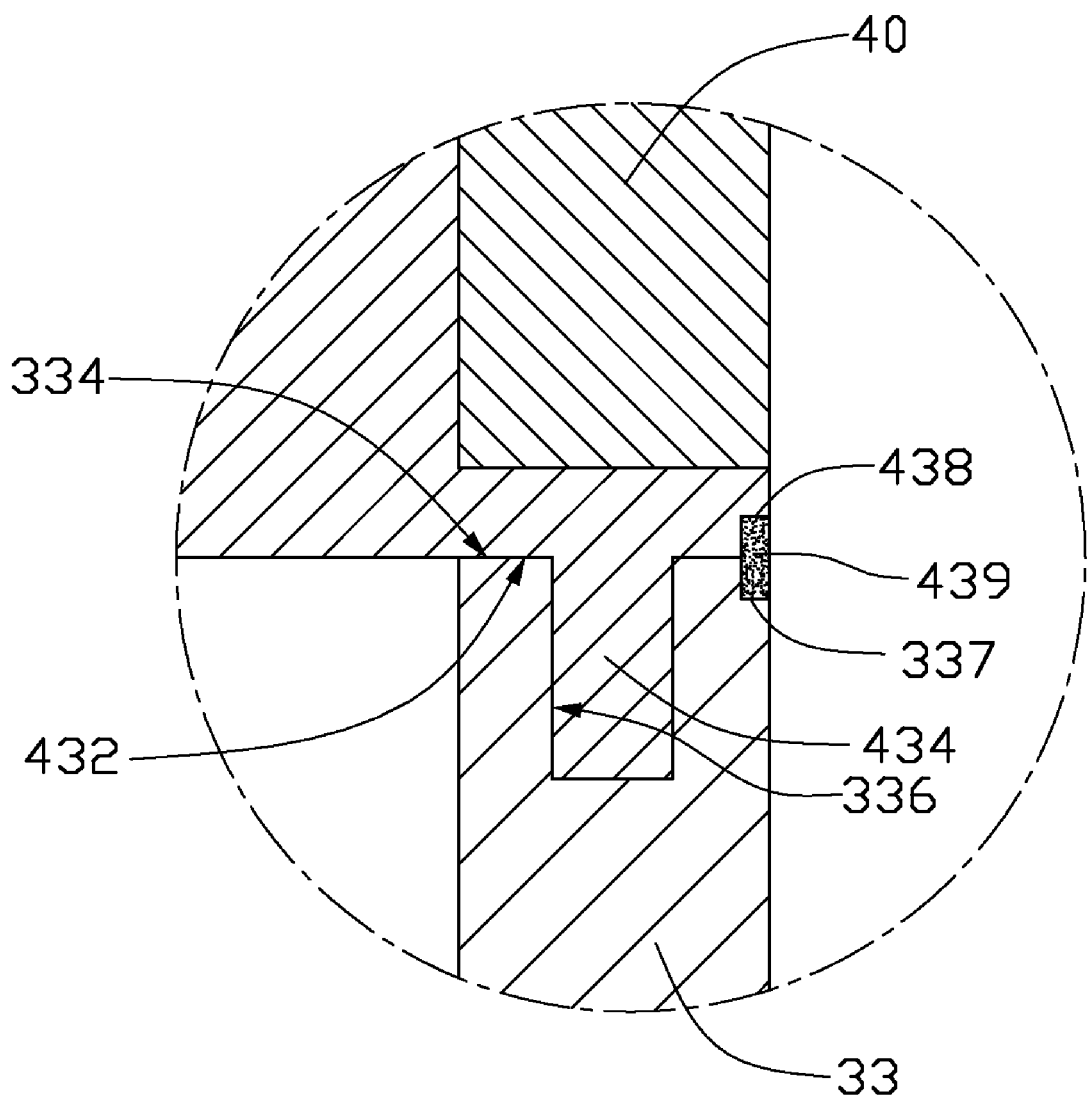
FIG. 2 is an enlarged view of the circle portion II of FIG. 1.

Referring to FIG. 2, together with FIG. 1, the supporting board 43 includes a bottom surface 432 supported on the upper end 334 of the lens holder 33 and two first connecting members 434. The supporting board 43 also defines a through hole 431 aligned with the central hole 474 and the through hole 418 of the housing 41. In this embodiment, the first connecting member is protrusion. The two protrusions 434 are integrally formed with and extend downwardly from the bottom surface 432 of the board 43. The upper end 334 of the lens holder 33 defines two second connecting members. The second connecting member is a receiving hole 336 to receive a corresponding protrusion 434. The first connecting member and the second connecting member are configured for assemble the VCM 40 onto the lens holder 33. It should be noted that the number of the protrusions 434 and the receiving holes 336 is not limited to two, but can be set depending on requirements.

In this embodiment, the circumference of the upper end 334 of the lens holder 33 defines a number of first receiving slots 337 surrounding the receiving hole 336, and the bottom surface 432 of the supporting board 43 defines a number of second receiving slots 438 communicating with the corresponding first receiving slots 337. An adhesive 439 is applied in the first and second receiving slots 337, 438 to enhance strength of engagement between the VCM 40 and lens holder 33.

When assembling, firstly, the upper portion 321 is coupled to the inner barrel 421 of the VCM 40 by thread engagement between the outer and inner threaded sections 3121,426. Thereby, the VCM 40 sleeves the upper portion 312 of the lens barrel 31. Secondly, the protrusions 434 are inserted into the corresponding receiving holes 336 via the pinch fitted method to firmly secure the VCM 40 onto the lens holder 33. Thereby, the VCM 40 is assembled with the lens holder 33. The first and second receiving slots 337, 438 are connected by the adhesive 439 to enhance the strength of engagement between the VCM 40 and the lens holder 33.

In use, an electric current is applied to the winding 424 of the movable unit 42. As a result, a magnetic field for interacting with the magnetic field of the fixed unit 44 is generated by the winding 424. Thereby, a magnetic force to drive the inner barrel 421 to move between the two resilient sheets 47 is produced. Due to the upper portion 312 of the lens barrel 31 being threadedly engaged with the inner barrel 421 of the movable unit 42, when the movable unit 42 moves relative to the fixed unit 44, the lens assembly 32 of the lens part 30 is focused by movement toward or away from the image sensor 10 to focus. When power to the winding 424 is turned off, the two resilient sheets 47 restore the movable unit 42.

The stepped structure of the lens barrel 33 allows the VCM 40 to be coiled around the lens barrel 33 without increasing the outer diameter of the lens barrel 33.

Figure 5:
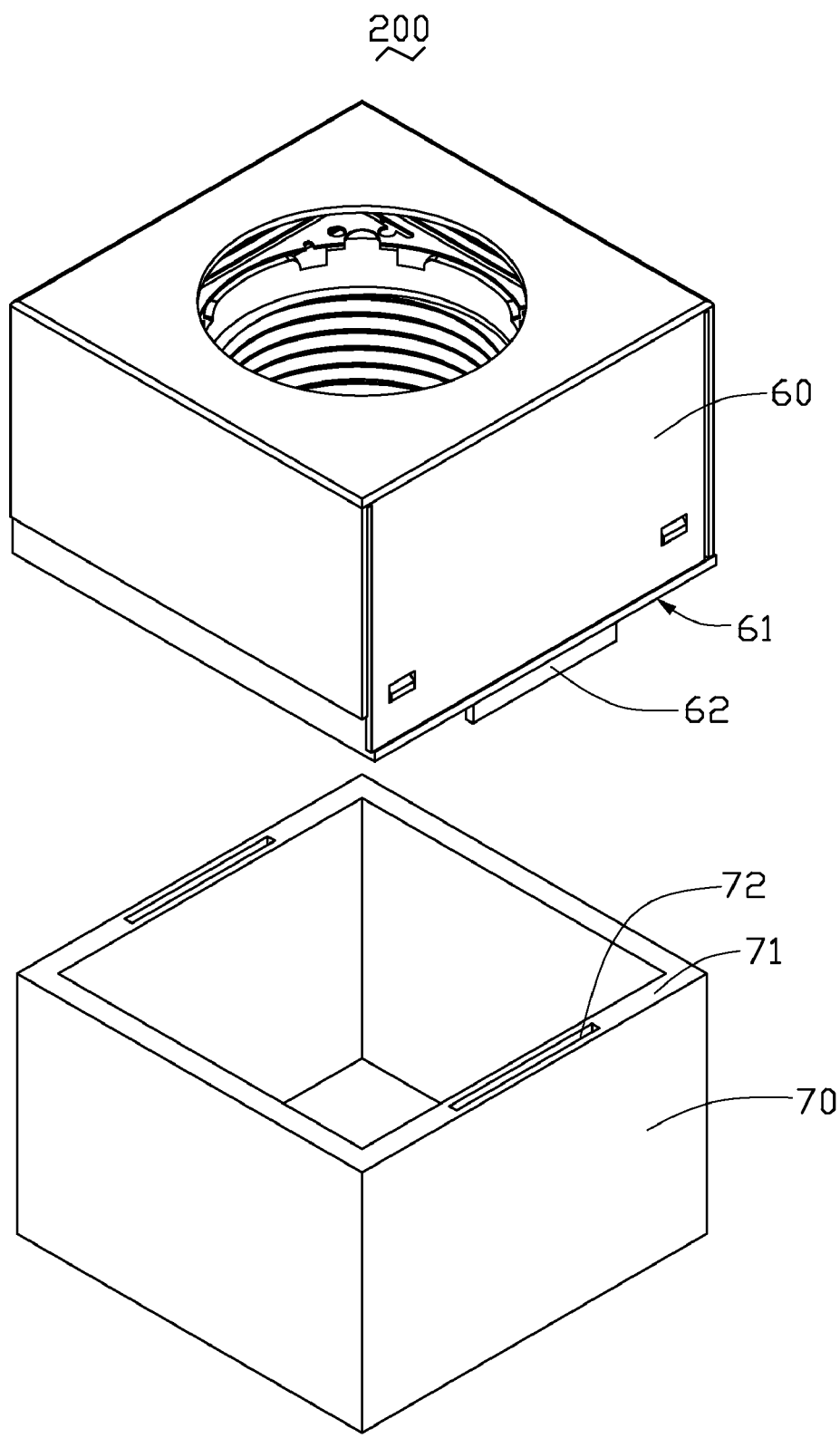
FIG. 5 is a schematic, isometric view of a camera module, according to a second exemplary embodiment.

FIG. 5 illustrates an imaging device 200, in accordance with a second exemplary embodiment. The imaging device 200 is essentially similar to the camera module 100 in the first embodiment, except for a VCM 60 and a lens holder 70. In this embodiment, the first connecting member is a locating pieces 62 and the second connecting member is a receiving recess 72. The two locating pieces 62 are integrally formed with and extend downward from two opposite sidewalls of the lower surface of the VCM 60. The upper surface 71 of the lens holder 70 defines two receiving recesses 72. When assembling, two locating pieces 62 are inserted into the corresponding receiving recesses 72 via a pinch fit method to firmly attach the VCM 60 onto the lens holder 70. Thereby, the VCM 60 is assembled with the lens holder 70.

Figure 6:
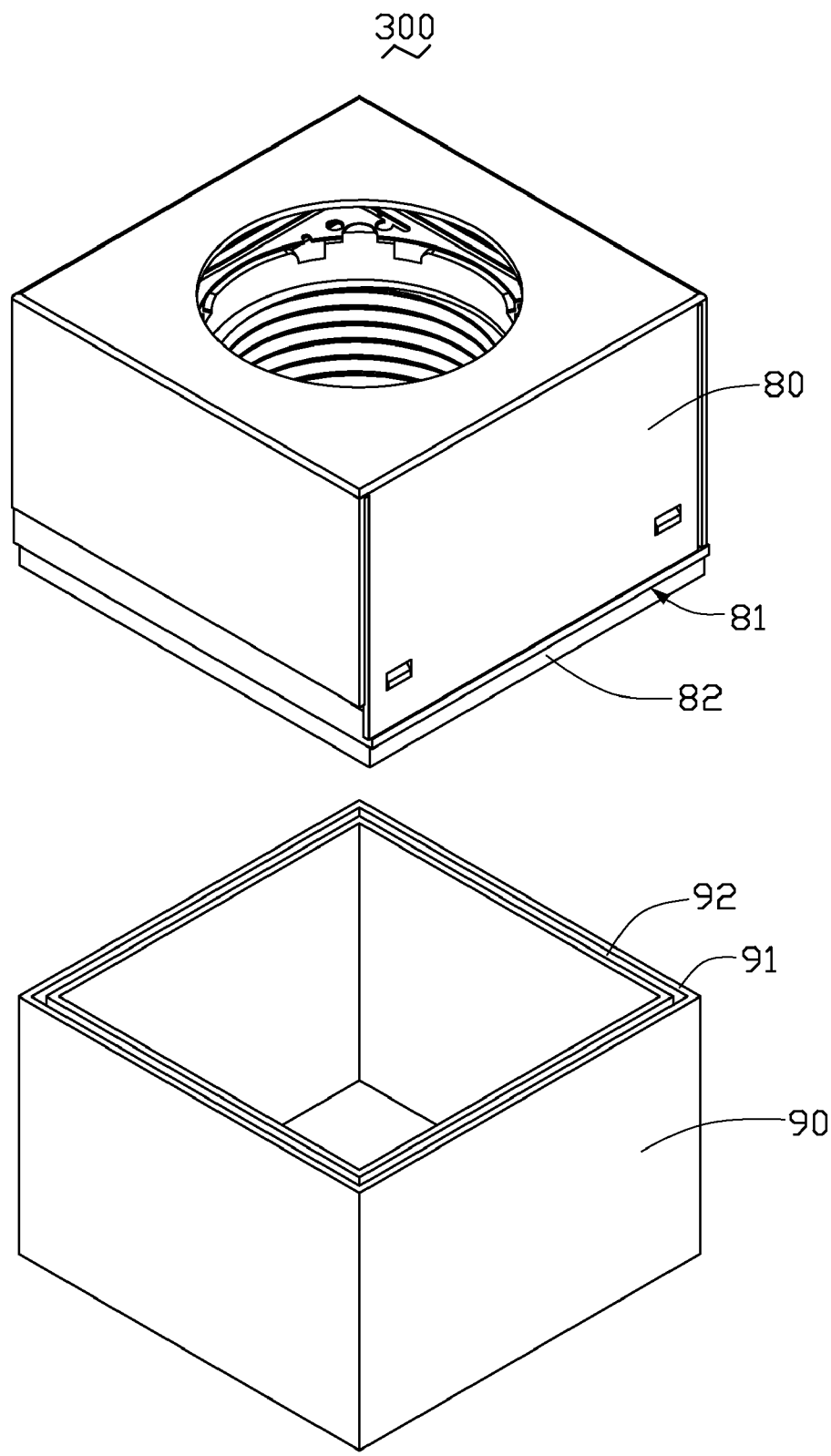
FIG. 6 is a schematic, isometric view of a camera module, according to a third exemplary embodiment.

FIG. 6 illustrates an camera module 300, in accordance with a third exemplary embodiment. The imaging device 300 is essentially similar to the imaging device 200 in the second embodiment, except for a VCM 80 and a lens holder 90. In this embodiment, the first connecting member is a surrounding locating block 82 and the second connecting member is a corresponding surrounding receiving recess 92. The surrounding locating block 82 is integrally formed with and extends downward from four sidewalls of the lower surface of the VCM 80. The receiving recess 92 is defined in the upper surface 91. When assembling, the locating block 82 is inserted into the receiving recess 92 via a pinch fit method to firmly attach the VCM 80 onto the lens holder 90. Thereby, the VCM 80 is assembled with the lens holder 90.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A camera module comprising:
   a substrate comprising a supporting surface;
   an imaging sensor supported on the supporting surface and electrically connected to the substrate;
   a lens holder comprising a bottom end supported on the substrate and an upper end opposite to the bottom end;
   a lens part comprising a upper portion and a bottom portion, the outer diameter of the upper portion being small than that of the bottom portion; and
   a voice-coil motor configured for driving the lens part to move toward or away from the image sensor, the voice-coil motor being sleeved around the upper portion;
   wherein a lower surface of the voice-coil motor defines a first connecting member, an upper surface of the lens holder defines a second connecting member, the first connecting member and the second connecting member are configured for assembling the voice-coil motor onto the lens holder.

2. The camera module as claimed in claim 1, wherein the bottom portion of the lens part is received in the lens holder.

3. The camera module as claimed in claim 1, wherein the lens part further comprises a first lens received in the upper portion, and a second lens received in the bottom portion.

4. The camera module as claimed in claim 1, wherein the image sensor is a charge-coupled device or a complementary metal oxide semiconductor device.

5. The camera module as claimed in claim 1, wherein the image sensor is one selected from the group consisting of a ceramic leaded chip carrier package type image sensor, a plastic leaded chip carrier package type image sensor and a chip scale package type image sensor.

6. The camera module as claimed in claim 1, wherein the lens holder has a square outer circumference and a circular inner circumference, the internal diameter of the circular inner circumference is larger than that of the bottom portion, the bottom portion is received in the lens holder.

7. The camera module as claimed in claim 1, wherein the imaging device further comprises a transparent cover, the lens holder further comprises a projection extending inwards, substantially parallel to the image sensor, the projection has a first surface facing away the image sensor, the first surface defines a cover-receiving portion for receiving the transparent cover, the transparent cover is configured for protecting the image sensor from contamination and filtering light from the lens part.

8. The camera module as claimed in claim 1, wherein the first connecting member is a protrusion, the second connecting member is a receiving hole.

9. The camera module as claimed in claim 1, wherein the first connecting member is a locating pieces, the second connecting member is a receiving recess.

10. The camera module as claimed in claim 1, wherein the first connecting member is a surrounding locating block and the second connecting member is a corresponding surrounding receiving recess.

11. The camera module as claimed in claim 1, wherein the voice-coil motor comprises a housing, a fixed unit, a movable unit and a supported board, the housing together with the supporting board defines a space for receiving the fixed unit and the movable unit.

12. The camera module as claimed in claim 11, wherein the circumference of the upper end of the lens holder defines a number of first receiving slots surrounding the receiving hole, and the bottom surface of the supporting board defines a number of second receiving slots communicating with the corresponding first receiving slots, an adhesive is applied in the first and second receiving slots.

13. The camera module as claimed in claim 11, wherein the fixed unit comprises a cuboid bracket and four magnet members, the four magnet members are framed in the cuboid bracket as four sidewalls of the cubic bracket and defines a receiving space therein for receiving the movable unit, the movable unit comprises an inner barrel and a winding, the winding is coiled around the outer surface of the inner barrel, the outer surface of the upper portion of the lens barrel defines an outer threaded section, the inner barrel defines an inner threaded section in the inner surface thereof, the upper portion of the lens barrel is coupled to the inner barrel of the movable unit by threads engagement between the outer and inner threaded sections.

14. The camera module as claimed in claim 1, wherein the lens part comprises a lens barrel, the lens top portion and the lens bottom portion are set on the lens barrel.

15. A device with imaging function, comprising:
a body; and
a camera module mounted on the body, the camera module comprising:
a substrate comprising a supporting surface;
an imaging sensor supported on the supporting surface and electrically connected to the substrate;
a lens holder comprising a bottom end sealed to the substrate and an upper end opposite to the bottom end;
a lens part, received in the lens holder, comprising a lens barrel comprising a upper portion and a bottom portion, the outer diameter of the upper portion being small than that of the bottom portion; and
a voice-coil motor configured for driving the lens part to move toward or away from the image sensor, the voice-coil motor being sleeved around the upper portion, the voice-coil motor comprising:
a housing;
a fixed unit;
a movable unit received in the fixed unit; and
a supported board, the housing together with the supporting board defines a space for receiving the fixed unit and the movable unit;
wherein a lower surface of the voice-coil motor defines a first connecting member, an upper surface of the lens holder defines a second connecting member, the first connecting member and the second connecting member are configured for assembling the voice-coil motor onto the lens holder.

16. The device as claimed in claim 15, wherein the fixed unit comprises a cuboid bracket and four magnet members, the four magnet members are framed in the cuboid bracket as four sidewalls of the cubic bracket and defines a receiving space therein for receiving the movable unit, the movable unit comprises an inner barrel and a winding, the winding is coiled around the outer surface of the inner barrel, the outer surface of the upper portion of the lens barrel defines an outer threaded section, the inner barrel defines an inner threaded section in the inner surface thereof, the upper portion of the lens barrel is coupled to the inner barrel of the movable unit by threads engagement between the outer and inner threaded sections.

* * * * *